United States Patent
Sogawa et al.

(10) Patent No.: US 10,865,851 B2
(45) Date of Patent: Dec. 15, 2020

(54) DAMPER DEVICE

(71) Applicant: HONDA MOTOR CO., LTD., Tokyo (JP)

(72) Inventors: Naoki Sogawa, Wako (JP); Kentaro Komori, Wako (JP); Gakuyo Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/269,909

(22) Filed: Feb. 7, 2019

(65) Prior Publication Data

US 2019/0242453 A1 Aug. 8, 2019

(30) Foreign Application Priority Data

Feb. 8, 2018 (JP) .................. 2018-020744

(51) Int. Cl.
| | | |
|---|---|---|
| *B60G 17/04* | (2006.01) | |
| *F16F 15/02* | (2006.01) | |
| *F16F 9/18* | (2006.01) | |
| *F16F 9/43* | (2006.01) | |

(52) U.S. Cl.
CPC ............... *F16F 15/02* (2013.01); *F16F 9/18* (2013.01)

(58) Field of Classification Search
CPC .... F16F 9/065; F16F 9/535; F16F 9/06; F16F 9/36; B60G 11/26; B60G 17/08; B60G 17/04
USPC ............. 188/267.1, 267.2; 280/124.157; 267/64.15, 116–124
See application file for complete search history.

(56) References Cited

U.S. PATENT DOCUMENTS

| | | | |
|---|---|---|---|
| 5,158,161 A | 10/1992 | Yamaoka et al. | |
| 6,279,701 B1* | 8/2001 | Namuduri | F16F 9/535 |
| | | | 188/267.2 |
| 7,374,028 B2* | 5/2008 | Fox | F16F 9/44 |
| | | | 188/322.14 |

(Continued)

FOREIGN PATENT DOCUMENTS

| | | |
|---|---|---|
| DE | 102014106723 A1 | 12/2014 |
| JP | S48-009515 U | 2/1973 |

(Continued)

OTHER PUBLICATIONS

Japanese Office Action dated Jul. 2, 2019 (6 pages). English translation is not available.

*Primary Examiner* — Christopher P Schwartz
(74) *Attorney, Agent, or Firm* — Rankin, Hill & Clark LLP

(57) ABSTRACT

A damper device provided with a single cylinder type erecting structure having a free piston includes: a partition wall fixed to the cylinder between a piston and the free piston and partitioning inside of the cylinder into spaces in an axial direction of the cylinder; a partition wall orifice composed of an orifice piercing through the partition wall; a piston orifice composed of an orifice piercing through the piston; a partition wall-side flow variable structure configured to regulate a flow rate of a viscous fluid passing through the partition wall orifice; a piston-side flow variable structure configured to regulate a flow rate of the viscous fluid passing through the piston orifice; and a control unit configured to control the partition wall-side flow variable structure and the piston-side flow variable structure.

4 Claims, 2 Drawing Sheets

(56) References Cited

U.S. PATENT DOCUMENTS

| | | | | |
|---|---|---|---|---|
| 7,422,092 B2* | 9/2008 | Hitchcock | ............... | F16F 9/535 |
| | | | | 188/267.1 |
| 9,550,405 B2* | 1/2017 | Marking | ................ | B60G 17/08 |
| 2005/0087409 A1* | 4/2005 | Browne | ................. | F16F 9/535 |
| | | | | 188/267.2 |
| 2010/0059321 A1* | 3/2010 | Boivin | .................... | F16F 9/065 |
| | | | | 188/284 |
| 2014/0353938 A1* | 12/2014 | Marble | ................. | B60G 11/26 |
| | | | | 280/124.157 |

FOREIGN PATENT DOCUMENTS

| | | | |
|---|---|---|---|
| JP | H03-051549 | A | 3/1991 |
| JP | H11-257407 | A | 9/1999 |
| JP | 2007-187176 | A | 7/2007 |
| JP | 2009-058081 | A | 3/2009 |

\* cited by examiner

DAMPER DEVICE

CROSS-REFERENCE TO RELATED APPLICATION

This application is based upon and claims priority from the Japanese Patent Application No. 2018-020744, filed on Feb. 8, 2018, the entire contents of which are incorporated herein by reference.

BACKGROUND OF THE INVENTION

1. Field of the Invention

The present invention relates to a damper device adapted to damp and absorb vibration and shock.

2. Description of the Related Art

As conventional means for damping and absorbing vibration and shock, a damper device of a type that allows a piston fixed to a piston rod to be reciprocated in a cylinder has been widely employed, as disclosed in Patent document 1 (Japanese Patent Application Publication No. 2007-187176).

The damper device disclosed in Patent document 1 includes, other than the piston rod and the piston, a free piston disposed in the cylinder so as to partition the inside of the cylinder into a liquid chamber into which a magnetic viscous fluid is filled, and a gas chamber into which a high pressure gas is filled.

With this configuration, when the damper is contracted in a case where the piston rod is made large in diameter to enhance rigidity of the damper, the amount of an increase in volume of the piston rod moving into the cylinder is canceled by compression of the gas chamber by the piston.

However, the damper device disclosed in Patent document 1 poses a problem in that, when it is brought into a high temperature state by continuous use or the like, gas is expanded to cause pressure in the gas chamber to increase excessively and thus damping force is not stabilized.

Moreover, sealability of the liquid chamber must be improved as the high pressure gas is filled into the gas chamber. For this reason, the damper device also poses a problem in that a sliding resistance between the piston rod and seal materials becomes high and thus smooth expansion and contraction of the damper device is hindered.

The present invention has therefore been made in view of the above problems, and an object of the present invention is to provide a damper device capable of stabilizing a damping force while enhancing rigidity, and performing smooth expansion and contraction.

SUMMARY OF THE INVENTION

In order to attain the above object, according to an aspect of the present invention, a damper device reflecting one aspect of the present invention includes: a cylinder having a cylindrical shape and closed at both ends; a piston provided on a shaft end of a piston rod that pierces through one end of the cylinder, and disposed without a gap in the cylinder so as to be freely reciprocated in an axial direction of the cylinder; a free piston provided between the other end of the cylinder and the piston, and disposed without a gap in the cylinder so as to be freely reciprocated in the axial direction of the cylinder; a partition wall fixed to the cylinder between the piston and the free piston and partitioning inside of the cylinder into spaces in the axial direction of the cylinder; a partition wall orifice composed of an orifice that pierces through the partition wall; a piston orifice composed of an orifice that pierces through the piston; a viscous fluid filled into a liquid chamber that is formed between the free piston and the one end of the cylinder in the cylinder; a compressible gas filled into a gas chamber that is formed between the free piston and the other end of the cylinder in the cylinder; a partition wall-side flow variable structure configured to regulate a flow rate of the viscous fluid passing through the partition wall orifice; a piston-side flow variable structure configured to regulate a flow rate of the viscous fluid passing through the piston orifice; and a control unit configured to control the partition wall-side flow variable structure and the piston-side flow variable structure.

BRIEF DESCRIPTION OF THE DRAWINGS

The features and advantages provided by one or more embodiments of the invention will become apparent from the detailed description given below and appended drawings which are given only by way of illustration, and thus are not intended as a definition of the limits of the present invention.

FIGS. 1A to 1C are sectional views schematically showing configuration of a damper device according to a first embodiment of the present invention, in which FIG. 1A shows a quiescent state (equilibrium state); FIG. 1B shows a contracted state (bumped state); and FIG. 1C shows an expanded state (rebound state).

FIGS. 2A to 2C are sectional views schematically showing configuration of a damper device according to a second embodiment of the present invention, in which FIG. 2A shows a quiescent state (equilibrium state); FIG. 2B shows a contracted state (bumped state); and FIG. 2C shows an expanded state (rebound state).

DETAILED DESCRIPTION OF THE PREFERRED EMBODIMENTS

Hereinafter, one or more embodiments of the present invention will be described in detail with reference to the drawings. Note that in the description below, the same constituent element is given the same reference sign and thus duplicate explanation thereof is omitted.

First Embodiment

Figure 1A:
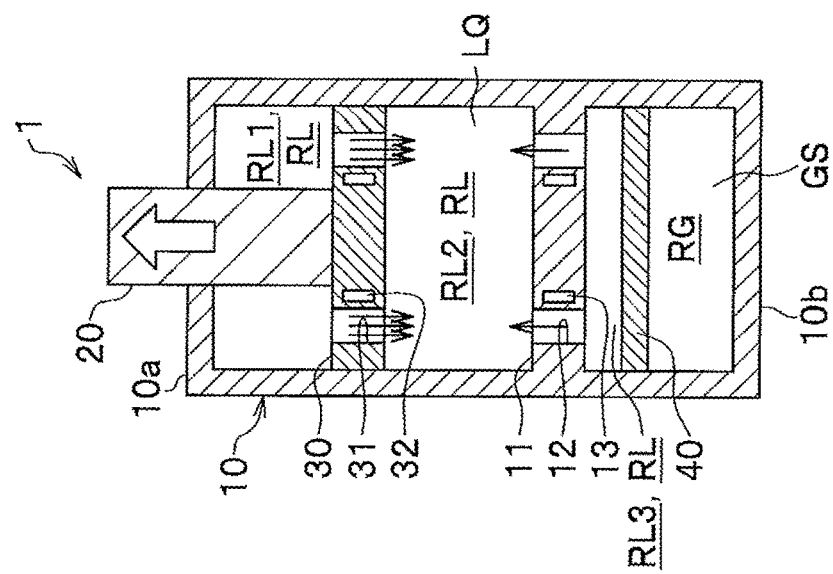
Figure 1B:
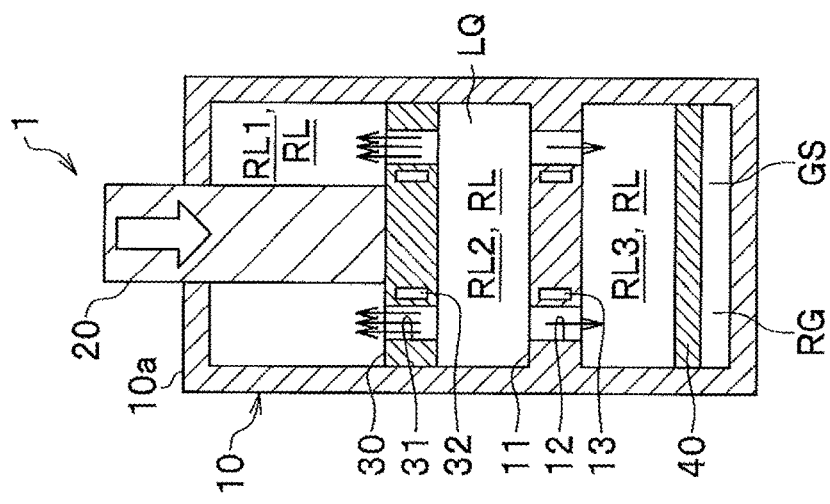
Figure 1C:
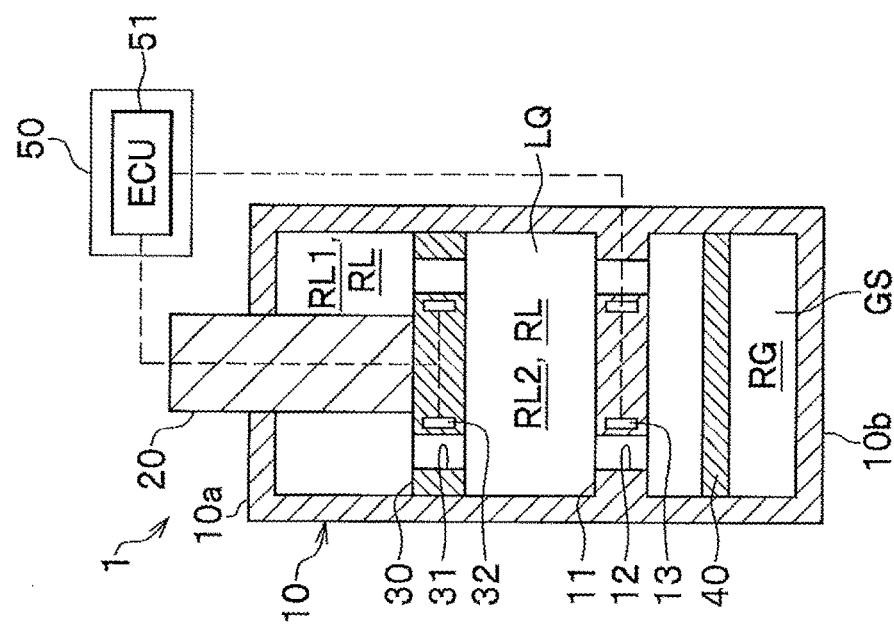

As shown in FIGS. 1A to 1C, a damper device 1 according to the present embodiment is provided with a cylinder 10, a piston rod 20, a piston 30, a free piston 40, and a control unit 50.

Moreover, the damper device 1 according to the present embodiment composes a suspension (not shown) of a four-wheeled vehicle, and in FIGS. 1A to 1C, a lower end part thereof is coupled to a wheel side (not shown) and an upper end part thereof is coupled to a vehicle body side (not shown).

As shown in FIGS. 1A to 1C, the cylinder 10 composes a lower part of the damper device 1 and a lower end thereof is coupled to the wheel side. Moreover, the cylinder 10 has a cylindrical shape of a single layer in a radial direction (is a single cylinder type), and is a sealed container closed at both ends. Furthermore, the cylinder 10 is provided with a partition wall 11 inside.

The partition wall 11 is composed of a circular plate that is fixed to the cylinder 10 orthogonally to the cylinder shaft, between the piston 30 and the free piston 40 in the cylinder 10, and partitions the inside of the cylinder 10 into two spaces in the axial direction of the cylinder 10. Moreover, the partition wall 11 is provided with a partition wall orifice 12 composed of an orifice that pierces through plate faces of the partition wall 11, and a partition wall coil 13 composed of an electromagnetic coil.

The partition wall coil 13 composes a partition wall-side flow variable structure that regulates a flow rate of a magnetic viscous fluid LQ passing through the partition wall orifice 12.

The magnetic viscous fluid (MRF: Magneto-Rheological Fluid) LQ is a viscous fluid that homogeneously contains fine particles consisting of magnetic substance. Moreover, the magnetic viscous fluid LQ is magnetized by ferromagnetic fine particles contained therein. Furthermore, the magnetic viscous fluid LQ is filled into a liquid chamber RL formed in the cylinder 10, as a working fluid of the damper device 1.

The partition wall coil 13 generates a magnetic field in the partition wall orifice 12 by current application. The generated magnetic field acts on the magnetic viscous fluid LQ passing through the partition wall orifice 12, and the ferromagnetic fine particles contained in the magnetic viscous fluid LQ form chained clusters. The formed clusters cause an apparent coefficient of viscosity of the magnetic viscous fluid LQ passing through the partition wall orifice 12 to become increased, and thus the flow rate of the magnetic viscous fluid LQ passing through the partition wall orifice 12 is decreased.

Next, the piston rod 20 and the piston 30 will be described (see FIGS. 1A to 1C).

The piston rod 20 is composed of a rod-like member. Moreover, the piston rod 20 composes an upper part of the damper device 1 and an upper end part thereof is coupled to the vehicle body side.

Furthermore, the piston rod 20 has a lower end part that is sealed without a gap to an upper end (one end) 10a of the cylinder 10 while piercing through the upper end 10a so as to be freely reciprocated in the axial direction of the cylinder 10.

The piston 30 is composed of a disk-like member disposed so as to allow plate faces thereof to be orthogonal to the cylinder shaft. Moreover, the piston 30 is provided on a lower shaft end of the piston rod 20 and disposed without a gap to an inner peripheral wall of the cylinder 10 so as to be freely reciprocated in the axial direction of the cylinder 10.

Furthermore, the piston 30 is provided with a piston orifice 31 composed of an orifice that pierces through plate faces of the piston 30, and a piston coil 32 composed of an electromagnetic coil.

The piston orifice 31 has a hole diameter set to be the same hole diameter as the partition wall orifice 12.

The piston coil 32 composes a piston-side flow variable structure that regulates a flow rate of the magnetic viscous fluid LQ passing through the piston orifice 31. The piston coil 32 performs, by current application, the same function as the partition wall coil 13 described above, thereby regulating the flow rate of the magnetic viscous fluid LQ passing through the piston orifice 31.

Next, the free piston 40 will be described (see FIGS. 1A to 1C).

The free piston 40 is composed of a disk-like member disposed so as to allow plate faces thereof to be orthogonal to the cylinder shaft. Moreover, the free piston 40 is provided between a lower end (the other end) 10b of the cylinder 10 and the piston 30, and disposed without a gap to the inner peripheral wall of the cylinder 10 so as to be freely reciprocated in the axial direction of the cylinder 10.

The free piston 40 forms the liquid chamber RL between the upper end 10a and the free piston 40, and forms a gas chamber RG between the lower end 10b and the free piston 40.

The magnetic viscous fluid LQ described above is filled into the liquid chamber RL and a compressible gas GS such as air or nitrogen gas is filled into the gas chamber RG.

The liquid chamber RL is partitioned by the partition wall 11 and the piston 30 into three spaces in the axial direction of the cylinder 10.

Note that the space between the upper end 10a and the piston 30 is referred to as a first liquid chamber RL1; the space between the piston 30 and the partition wall 11 is referred to as a second liquid chamber RL2; and the space between the partition wall 11 and the free piston 40 is referred to as a third liquid chamber RL3.

Next, the control unit 50 will be described (see FIG. 1A).

The control unit 50 includes an ECU (Electronic Control Unit) 51.

The ECU 51 controls voltages and currents to be applied to the piston coil 32 and the partition wall coil 13 in response to a contraction speed and an expansion speed of the damper device 1. Moreover, the control unit 50 performs control so as to change the apparent coefficient of viscosity of the magnetic viscous fluid LQ to regulate the flow rate of the magnetic viscous fluid LQ passing through the piston orifice 31 and the partition wall orifice 12.

Note that in the present embodiment, the ECU 51 performs control so as to allow the flow rate of the magnetic viscous fluid LQ passing through the piston orifice 31 to become larger than the flow rate of the magnetic viscous fluid LQ passing through the partition wall orifice 12.

Next, functions of the damper device 1 will be described (see FIGS. 1A to 1C).

As shown in FIG. 1B, at the time of contraction of the damper, the pressure in the liquid chamber RL transiently has the following relation:

Pressure in the second liquid chamber>Pressure in the third liquid chamber>Pressure in the first liquid chamber Moreover, the magnetic viscous fluid LQ passes through the piston orifice 31 and the partition wall orifice 12, respectively, to move from the second liquid chamber RL2 into the first liquid chamber RL1 and the third liquid chamber RL3, respectively. At this time, a damping force is generated according to the flow rate of moving fluid.

For example, when the flow rate of the magnetic viscous fluid LQ moving from the second liquid chamber RL2 into the third liquid chamber RL3 becomes larger than the flow rate of the magnetic viscous fluid LQ moving from the second liquid chamber RL2 into the first liquid chamber RL1, the damping force to be generated depends on the pressure in the gas chamber RG.

Therefore, the pressure in the gas chamber RG must be increased to obtain a sufficient damping force.

Consequently, where the damper device 1 and the magnetic viscous fluid LQ are increased in temperature by continuous use of the damper, the volume of the gas in the gas chamber RG and the magnetic viscous fluid LQ is increased. This causes a risk that the pressure in the gas chamber RG is excessively increased to affect the damping force.

In contrast, when the flow rate of the magnetic viscous fluid LQ moving from the second liquid chamber RL2 into the third liquid chamber RL3 becomes smaller than the flow rate of the magnetic viscous fluid LQ moving from the second liquid chamber RL2 into the first liquid chamber RL1, the damping force to be generated depends on the flow rate (coefficient of viscosity) of the magnetic viscous fluid LQ moving from the second liquid chamber RL2 into the first liquid chamber RL1.

Consequently, the damping force can be generated in the piston orifice 31 regardless of the gas pressure in the gas chamber RG, thus making it possible to set the gas pressure in the gas chamber to a lower level.

Moreover, even where the damper device 1 is increased in temperature by continuous use thereof, the pressure in the gas chamber RG is not increased to such an extent that the damping force is affected.

That is, a stabilized damping force can be obtained.

As shown in FIG. 1C, at the time of expansion of the damper, the flow of the magnetic viscous fluid LQ passing through each orifice is in the opposite direction to the flow at the time of contraction of the damper, but the ratio of the flow rates is the same. That is, the flow rate of the magnetic viscous fluid LQ passing through the piston orifice 31 is controlled to be larger than the flow rate of the magnetic viscous fluid LQ passing through the partition wall orifice 12.

Note that, at the time of expansion of the damper, the flow rate of the magnetic viscous fluid LQ passing through each orifice may be controlled to allow the damping force to be reduced as compared to an expanding speed of the damper. Where the control is performed in this way, the expanding speed of the damper is increased and road surface follow-up property of the wheel (not shown) is further improved.

Next, description will be given of operation and effects of the damper device 1 according to the present embodiment.

The damper device 1 according to the present embodiment is provided with the piston coil 32 (piston-side flow variable structure), the partition wall coil 13 (partition wall-side flow variable structure), and the control unit 50 configured to control the piston coil 32 and the partition wall coil 13.

With this configuration, the free piston 40 is prevented from being moved unnecessarily in the cylinder 10.

Consequently, the damping force can be obtained in the piston orifice 31 while decreasing the pressure in the gas chamber RG.

Moreover, even in a case where the piston rod 20 is made large in diameter and the volume of the piston rod 20 moving into the cylinder 10 is increased at the time of contraction of the damper, it is possible to cope with the case by compression of the gas chamber RG.

Furthermore, even where the damper device 1 and the magnetic viscous fluid LQ are brought into a high temperature state by continuous use and the volume of the gas in the gas chamber RG and the magnetic viscous fluid LQ is increased, the gas chamber RG can be prevented from being brought into an excessively high pressure state and thus a stabilized damping force can be obtained.

Therefore, the stabilized damping force can be obtained while achieving high rigidity of the damper device 1 due to an increase in diameter of the piston rod 20.

Moreover, since the gas chamber RG can be brought into a low pressure state, sealability of the liquid chamber can be eased. Although seal materials having high sealability have a high sliding resistance to the piston rod, seal materials having a low sliding resistance can be employed because the sealability of the liquid chamber is eased.

This makes it possible for the damper device 1 to be smoothly expanded and contracted.

In the present embodiment, the magnetic viscous fluid LQ is employed for the viscous fluid, and the electromagnetic coils are employed for the partition wall-side flow variable structure (the partition wall coil 13) and the piston-side flow variable structure (the piston coil 32).

This makes it possible to regulate the flow rate of the viscous fluid passing through the orifices, with a relatively simple configuration.

Note that the viscous fluid filled into the liquid chamber RL is not limited to the magnetic viscous fluid LQ.

For example, hydraulic oil (damper fluid) filled into a general damper can be employed for the viscous fluid.

In this case, for the flow variable structure, configuration is employed such that a conical needle is inserted removably into the piston orifice 31 and the partition wall orifice 12, respectively, to change an opening space of each orifice to change the flow rate.

In the present embodiment, when the damper device 1 is expanded and contracted, the control unit 50 controls the partition wall coil 13 (partition wall-side flow variable structure) and the piston coil 32 (piston-side flow variable structure) so as to allow the flow rate of the magnetic viscous fluid LQ passing through the piston orifice 31 to become larger than the flow rate of the magnetic viscous fluid LQ passing through the partition wall orifice 12.

This makes it possible to bring the gas chamber RG into a low pressure state and thus to obtain a still more stabilized damping force.

The damper device 1 according to the present embodiment is provided with so-called single cylinder type erecting structure in which the upper end part of the piston rod 20 is coupled to the vehicle body side, and the lower end of the cylinder 10 is coupled to the wheel side.

With this configuration, the damper device 1 can be configured with a few components and simple structure, as compared to double cylinder type structure or inverted structure.

This makes it possible to manufacture the damper device 1 that has high rigidity and excellent heat dissipation and generates a stabilized damping force, at low cost.

Second Embodiment

Next, a damper device 1A according to the second embodiment will be described with reference to the drawings. The same constituent element as that in the damper device 1 described above is given the same reference sign and thus duplicate explanation thereof is omitted.

Figure 2A:
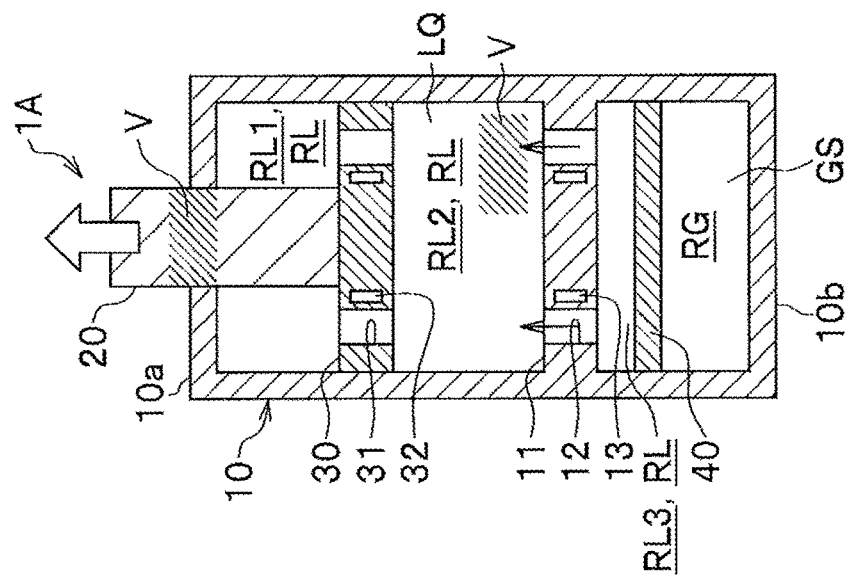
Figure 2B:
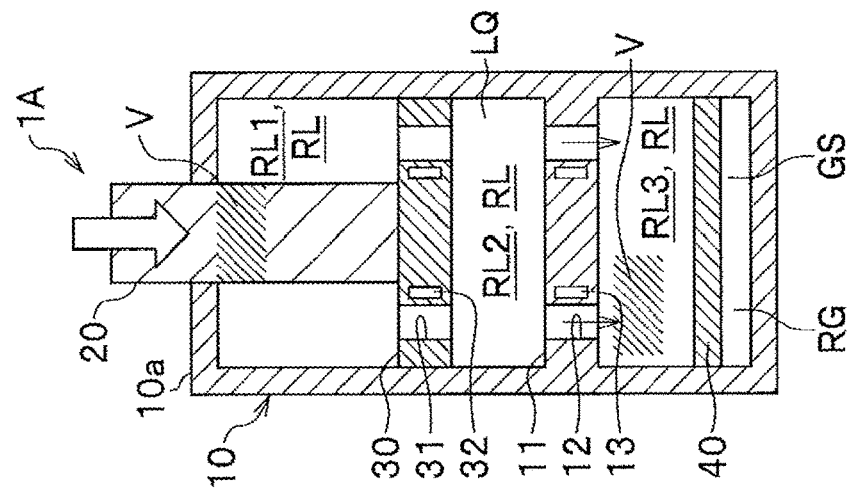
Figure 2C:
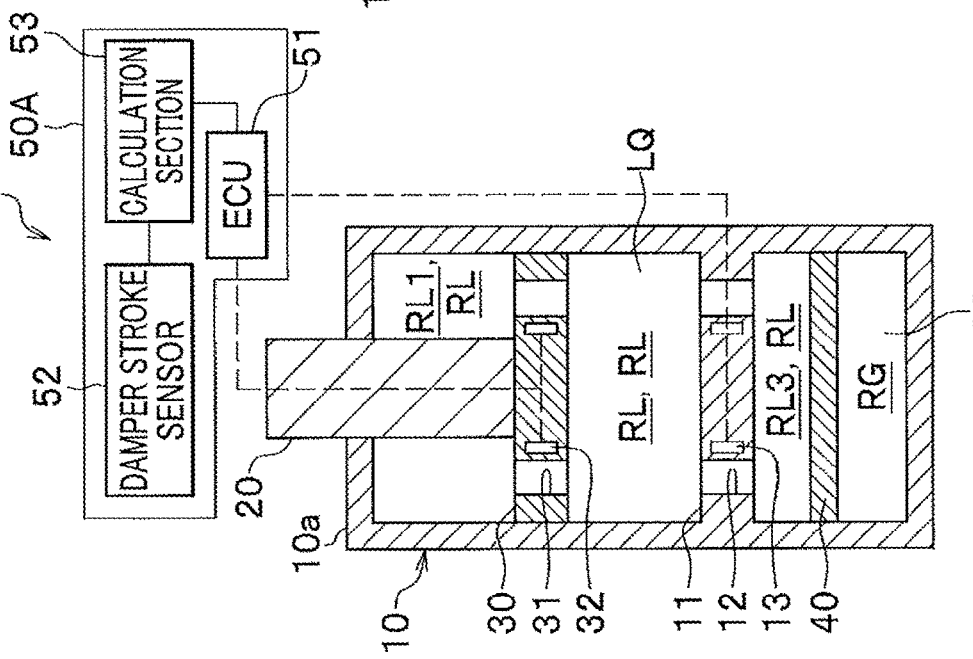

As shown in FIGS. 2A to 2C, the present embodiment is different from the first embodiment described above in the configuration and control method of a control unit 50A.

The control unit 50A according to the present embodiment includes, other than the ECU 51, a damper stroke sensor 52 and a calculation section 53 (see FIG. 2A).

The damper stroke sensor 52 is adapted to measure the amount of stroke when the damper device 1 is expanded and contracted.

The calculation section 53 is adapted to calculate volume V of the piston rod 20 moving into/out of the cylinder 10, based on the product of the measured amount of stroke by the shaft diameter of the piston rod 20.

The ECU 51 controls the piston coil 32 and the partition wall coil 13 so as to allow the magnetic viscous fluid LQ having the amount equal to or smaller than the calculated volume V to pass through the partition wall orifice 12.

Where the magnetic viscous fluid LQ having the same amount as the calculated volume V passes through the partition wall orifice 12, the volume of the piston rod 20 reciprocating in the cylinder 10 at the time of expansion and contraction of the damper can be absorbed by expansion and compression of the gas chamber RG.

Moreover, where the magnetic viscous fluid LQ having the amount smaller than the calculated volume V passes through the partition wall orifice 12, the damping force can be generated in the partition wall orifice 12 while absorbing the volume of the piston rod 20 reciprocating in the cylinder 10.

Next, description will be given of operation and effects of the damper device 1A according to the present embodiment.

The damper device 1A according to the present embodiment produces the same operation and effects as in the first embodiment described above.

Moreover, the damper device 1A according to the present embodiment is configured to calculate the volume of the piston rod 20 reciprocating in the cylinder 10 at the time of expansion and contraction of the damper. Furthermore, the piston coil 32 and the partition wall coil 13 are controlled so as to allow the magnetic viscous fluid LQ having the amount equal to or smaller than the calculated volume V to pass through the partition wall orifice 12.

This makes it possible to set the gas pressure in the gas chamber RG to a further lower level, and thus the damping force can be further stabilized.

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE SIGNS

1: Damper device; 10: Cylinder; 11: Partition wall; 12: Partition wall orifice; 13: Partition wall coil (Partition wall-side flow variable structure); 20: Piston rod; 30: Piston; 31: Piston orifice; 32: Piston coil (Piston-side flow variable structure); 40: Free piston; 50: Control unit; GS: Compressible gas; LQ: Magnetic viscous fluid (Viscous fluid)

What is claimed is:

1. A damper device comprising:
   a cylinder having a cylindrical shape and closed at both ends;
   a piston provided on a shaft end of a piston rod that pierces through one end of the cylinder, and disposed without a gap in the cylinder so as to be freely reciprocated in an axial direction of the cylinder;
   a free piston provided between the other end of the cylinder and the piston, and disposed without a gap in the cylinder so as to be freely reciprocated in the axial direction of the cylinder;
   a partition wall fixed to the cylinder between the piston and the free piston and partitioning inside of the cylinder into spaces in the axial direction of the cylinder;
   a partition wall orifice composed of an orifice that pierces through the partition wall;
   a piston orifice composed of an orifice that pierces through the piston;
   a viscous fluid filled into a liquid chamber that is formed between the free piston and the one end of the cylinder in the cylinder;
   a compressible gas filled into a gas chamber that is formed between the free piston and the other end of the cylinder in the cylinder;
   a partition wall-side flow variable structure configured to regulate a flow rate of the viscous fluid passing through the partition wall orifice;
   a piston-side flow variable structure configured to regulate a flow rate of the viscous fluid passing through the piston orifice; and
   a control unit configured to control the partition wall-side flow variable structure and the piston-side flow variable structure,
   wherein the control unit controls the partition wall-side flow variable structure and the piston-side flow variable structure so as to allow the flow rate of the viscous fluid passing through the piston orifice to become larger than the flow rate of the viscous fluid passing through the partition wall orifice.

2. The damper device as set forth in claim 1, wherein the viscous fluid is a magnetic viscous fluid, and
   the partition wall-side flow variable structure and the piston-side flow variable structure are each composed of an electromagnetic coil.

3. The damper device as set forth in claim 1, wherein the control unit performs control so as to allow volume of the viscous fluid passing through the partition wall orifice at a time of contraction of the damper to become equal to or smaller than volume of the piston rod moving into the cylinder.

4. The damper device as set forth in claim 1, wherein the cylinder is a single cylinder type, and the other end thereof is supported below the piston rod, and
   the piston orifice and the partition wall orifice are situated in series in an axial direction of the piston rod, and the piston orifice and the partition wall orifice have a same hole diameter.

* * * * *